United States Patent [19]

Kobayashi

[11] Patent Number: 5,787,496
[45] Date of Patent: Jul. 28, 1998

[54] DIGITAL SIGNAL PROCESSOR HAVING A PARTITIONED MEMORY WITH FIRST AND SECOND ADDRESS AREAS FOR RECEIVING AND STORING DATA IN SYCHRONISM WITH FIRST AND SECOND SAMPLING CLOCKS

[75] Inventor: Shinji Kobayashi, Kanagawa, Japan

[73] Assignee: Sony Corporation, Tokyo, Japan

[21] Appl. No.: 636,342

[22] Filed: Apr. 23, 1996

[30] Foreign Application Priority Data

Apr. 28, 1995 [JP] Japan ............... 7-106774
Jul. 26, 1995 [JP] Japan ............... 7-190752

[51] Int. Cl.$^6$ .................... G06F 12/02; G06F 12/06
[52] U.S. Cl. .................... 711/220; 711/217; 711/218; 711/219
[58] Field of Search .................. 395/421.1, 421.07, 395/421.08; 364/715.01, 724.01, 724.06, 724.08, 754, 718.01; 711/217, 218, 220

[56] References Cited

U.S. PATENT DOCUMENTS

| | | | |
|---|---|---|---|
| 4,511,966 | 4/1985 | Hamada | 364/754 |
| 4,953,117 | 8/1990 | Lagadec | 364/724.1 |
| 5,065,433 | 11/1991 | Ida et al. | 381/63 |
| 5,086,475 | 2/1992 | Kutaragi et al. | 395/2.74 |
| 5,471,411 | 11/1995 | Adams et al. | 364/724.01 |

*Primary Examiner*—Eddie P. Chan
*Assistant Examiner*—Than V. Nguyen
*Attorney, Agent, or Firm*—Jay H. Maioli

[57] ABSTRACT

A digital signal processor includes first and second counters which increment from each initial address value in first and second address areas synchronous with first and second sampling clock signals, an address generating circuit which generates a first address number in the above first address area according to a counter value in the above first counter and generates a second address number in the above second address area according to a counter value in the above second counter, a data memory which stores information signals supplied synchronous with the above first and second sampling clock signals in the first and second address numbers generated by the above address generating circuit readably and an arithmetic operating circuit which performs arithmetic operation of information signals stored in the above data memory.

3 Claims, 9 Drawing Sheets

| MODE | RECORDING/REPRODUCTION MODE | | | | REPRODUCTION SPECIALIZED MODE | |
|---|---|---|---|---|---|---|
| ITEM | STANDARD (48k·MODE) | OPTION 1 (32k·MODE) | OPTION 2 (32k·LP MODE) | OPTION 3 (32k·4CH MODE) | NORMAL TRACK (44k·MODE) | WIDE TRACK (44k·WT MODE) |
| NO. OF CHANNELS (CH) | 2 | 2 | 2 | 4 | 2 | 2 |
| SAMPLING FREQUENCY (kHZ) | 48 | 32 | 32 | 32 | 44.1 | 44.1 |
| QUANTIZING BIT NUMBER (bit) | 16 (LINEAR) | 16 (LINEAR) | 12 (NON-LINEAR) | 12 (NON-LINEAR) | 16 (LINEAR) | 16 (LINEAR) |
| TRACK RECORDING DENSITY (kbpi) | 61.0 | | 61.0 | | 61.0 | 61.1 |
| FACE RECORDING DENSITY (Mbpi$^2$) | 114 | | 114 | | 114 | 76 |
| TRANSMISSION RATE (Mbps) | 2.46 | 2.46 | 1.23 | 2.46 | 2.46 | 2.46 |
| SUB-CODE CAPACITY (kbps) | 273.1 | 273.1 | 136.5 | 273.1 | 273.1 | 273.1 |
| MODULATION TYPE | 8-10 MODULATION TYPE ||||||
| CORRECTION TYPE | DUPLEX READ SOLOMON CODE ||||||
| TRACKING TYPE | AREA DIVISION ATF ||||||
| TAPE SPEED (mm/s) | 8.15 | 8.15 | 4.075 | 8.15 | 8.15 | 12.225 |
| TRACK PITCH (μ) | 13.591 | 13.591 | 1.567 | 3.133 | 13.591 | 20.41 |
| TRACK ANGLE | 6° 22' 59.5" |||| 6° 23' 29.4" ||
| STANDARD DRUM SPECIFICATION | φ30 90° WRAP ||||||
| DRUM SPEED (r.p.m) | 2000 | 2000 | 1000 | 2000 | 2000 | 2000 |
| RELATIVE SPEED (m/s) | 3.133 | 3.133 | 1.567 | 3.133 | 3.133 | 3.129 |
| HEAD AZIMUTH ANGLE | ±20° ||||||

FIG. 2

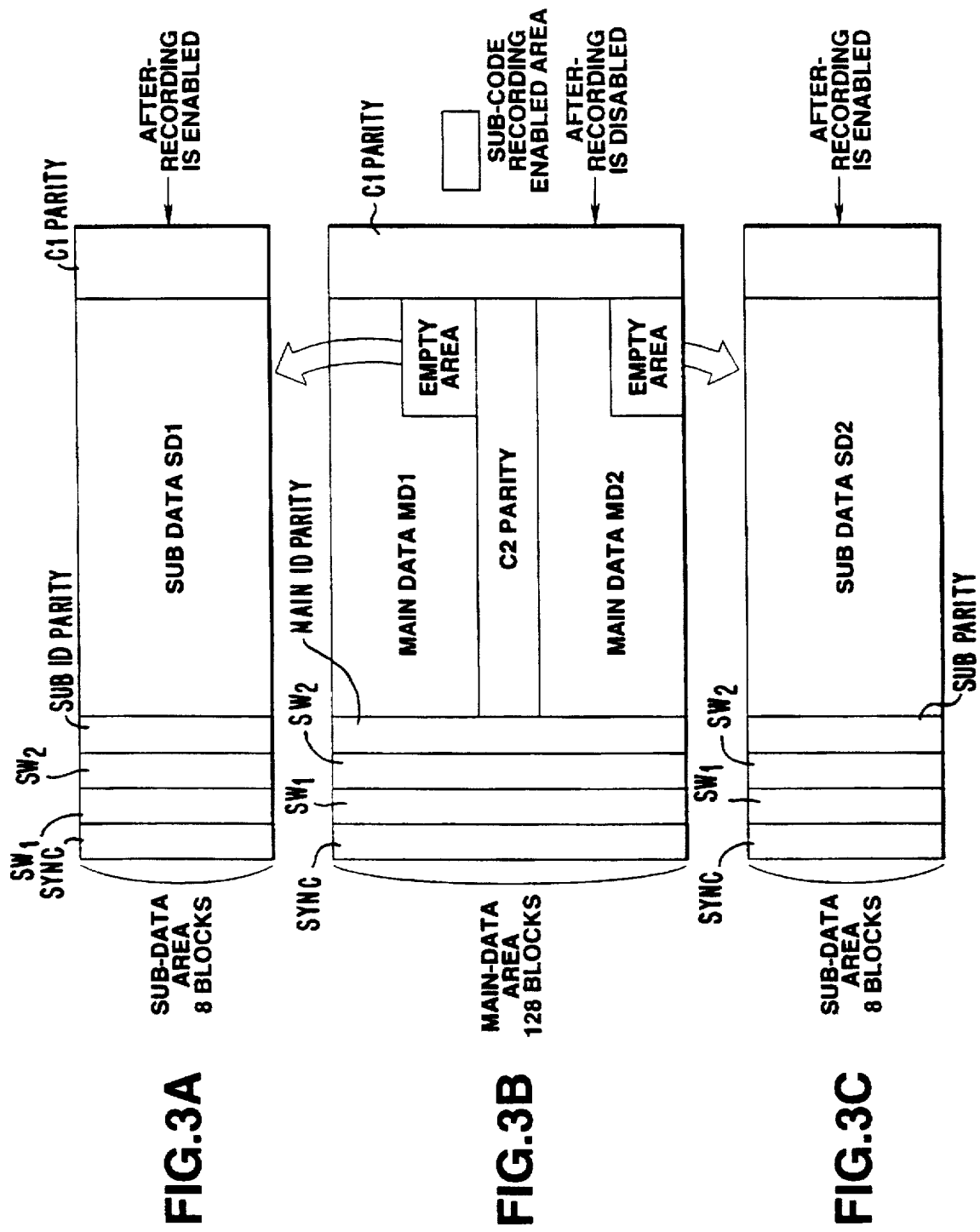

FIG. 4A

| SYNC 8BITS | MAIN ID | | MAIN ID PARITY 8BITS | MAIN DATA (Dij,Pij,Qij) 256 BITS (32 SYMBOLS) | | | |
|---|---|---|---|---|---|---|---|
| | W₁ 8BITS | W₂ 8BITS | | 8BITS | 8BITS | ... | 8BITS |

1 BLOCK = 8+8+8+8+8×32 = 288BITS i = 0, 1, 2, ...... 127
j = 0, 1, 2, ...... 31

FIG. 4B

MAIN ID

| | W₁ (SUB-CODE) | | | | W₂ (SUB-CODE) | | | | | | | |
|---|---|---|---|---|---|---|---|---|---|---|---|---|
| | B7 | B6 | B5 | B4 | B3 | B2 | B1 | B0 | B7 | B6 | B5 | B4 | B3 | B2 | B1 | B0 |
| | FORMAT HD ID 0 | ID1 | | | FRAME ADDRESS | | | | 0 | × | × | × | × | 0 | 0 | 0 |
| | ID2 | ID3 | | | FRAME ADDRESS | | | | 0 | × | × | × | × | 0 | 1 | 0 |
| | ID4 | ID5 | | | FRAME ADDRESS | | | | 0 | × | × | × | × | 1 | 0 | 0 |
| | ID6 | ID7 | | | FRAME ADDRESS | | | | 0 | × | × | × | × | 1 | 1 | 0 |

} EVEN ADDRESS BLOCK

ID1~ID6 ARE ALWAYS TO BE RECORDED

EACH DATA IS OVERWRITTEN BY 16×2 = 32 IN EACH FRAME

FIG. 4C

| | CONTENT |
|---|---|
| ID1 | EMPHASIS |
| ID2 | SAMPLING FREQUENCY |
| ID3 | CHANNEL NUMBER |
| ID4 | QUANTIZING RULE |
| ID5 | TRACK PITCH |
| ID6 | COPY PROHIBITED |
| ID7 | FOR PACKING |

DIGITAL SIGNAL PROCESSOR HAVING A PARTITIONED MEMORY WITH FIRST AND SECOND ADDRESS AREAS FOR RECEIVING AND STORING DATA IN SYCHRONISM WITH FIRST AND SECOND SAMPLING CLOCKS

BACKGROUND OF THE INVENTION

1. Field of the Invention:

This invention relates to a digital signal processor and, more particularly, to a digital signal processor for storing digital information signals which use a plurality of different sampling frequencies in a single memory and for processing the digital information signals stored in the memory.

2. Description of the Related Art:

Digital signal processors have been prevailing recently, which perform specified signal processing on digital information signals such as command signals, picture signals, audio signals and data. They are mounted and supplied in computers, picture signal processors, audio signal processors and the like.

In the above digital signal processors, a sampling clock signal is generated in response to a different sampling frequency, based on the standard of a system in which the above digital signal processor is installed. The digital signal processor comprises a base counter which increments synchronous with a sampling clock signal and a data memory which modulo-adds an address specified by a command to a counter value in the base counter and stores the digital information signal on the address readably.

In the above digital signal processor, the above data memory is divided into individual address areas at each of sampling frequencies so that information signals having mutually different sampling frequencies can be processed by processing information signal of each address area.

In a digital signal processor, for example when it constitute a digital filter, a coefficient is multiplied by data previously-sampled, and the obtained data as added to a data.

In this case, because it is possible to specify a value of last sampling as address of −1, a method in which the base counter and specified address are modulo-added is generally used. In this case, if two data having different sampling frequencies are allocated in the same memory without any procedure, each data is damaged because the base counter increments are different between these data.

OBJECT AND SUMMARY OF THE INVENTION

Therefore, it is a first object of the present invention to provide a digital signal processor in which digital information signal is not damaged when an address is specified.

A digital signal processor according to an aspect of the present invention comprises a first counter which increments from an initial address value in a first address area synchronous with a first sampling clock signal, a second counter which increments from an initial address value in a second address area synchronous with a second sampling clock signal, an address generating circuit which generates a first address number in the above first address area according to a counter value in the above first counter and generates a second address number in the above second address area according to a counter value in the above second counter, a data memory which stores information signals readably supplied synchronous with the above first and second sampling clock signals in the first and second address numbers generated by the above address generating circuit and an arithmetic operating circuit which performs arithmetic operation of information signals stored in the above data memory.

The above address generating circuit comprises an area detecting circuit for detecting an address area according to a specified address in response to counter values of the first and second counters and commands, a first masking circuit for masking a first address value according to a detection result of the above area detecting circuit, a first offset circuit for offsetting the above first address value, a second masking circuit for masking a second address value according to a detection result of the above area detecting circuit and a second offset circuit for offsetting the above second address value.

According to the digital signal processor of the present invention having the above mentioned components, it is possible to divide the data memory into a first address area and a second address area and then write and read information signals supplied synchronous with the first and second different sampling clock signals in and from the first and second address areas.

Further, the address generating circuit masks address numbers by means of a masking circuit according to a detection result of the area detecting circuit and offsets by means of the offset circuit to avoid writing of information signals in addresses beyond each address area in the data memory.

BRIEF DESCRIPTION OF THE DRAWINGS

FIG. 2 is a diagram showing the standard of major parts of recording/reproducing modes of the above DAT and reproduction specialized mode.

FIGS. 3A, 3B, 3C show schematic construction diagrams of 1-block format of the main data of the above DAT while FIG. 3A is a construction drawing of main data area and FIGS. 3B, 3C are construction drawings of sub-data area to be installed in empty area of the main data area.

FIGS. 4A, 4B, 4C show schematic construction diagrams of 1-block format of the main data of the above DAT while FIG. 4A is an overall drawing, FIG. 4B is a construction diagram of the main ID and FIG. 4C is a diagram showing the functions of each main ID.

FIGS. 5A, 5B show schematic construction diagrams of 1-block format of the sub-data of the above DAT while FIG. 5A is an overall drawing and FIG. 5B is a construction drawing of the sub ID.

DESCRIPTION OF THE PREFERRED EMBODIMENTS

Hereinafter, the preferred embodiments of the present invention will be described in detail.

Figure 1:
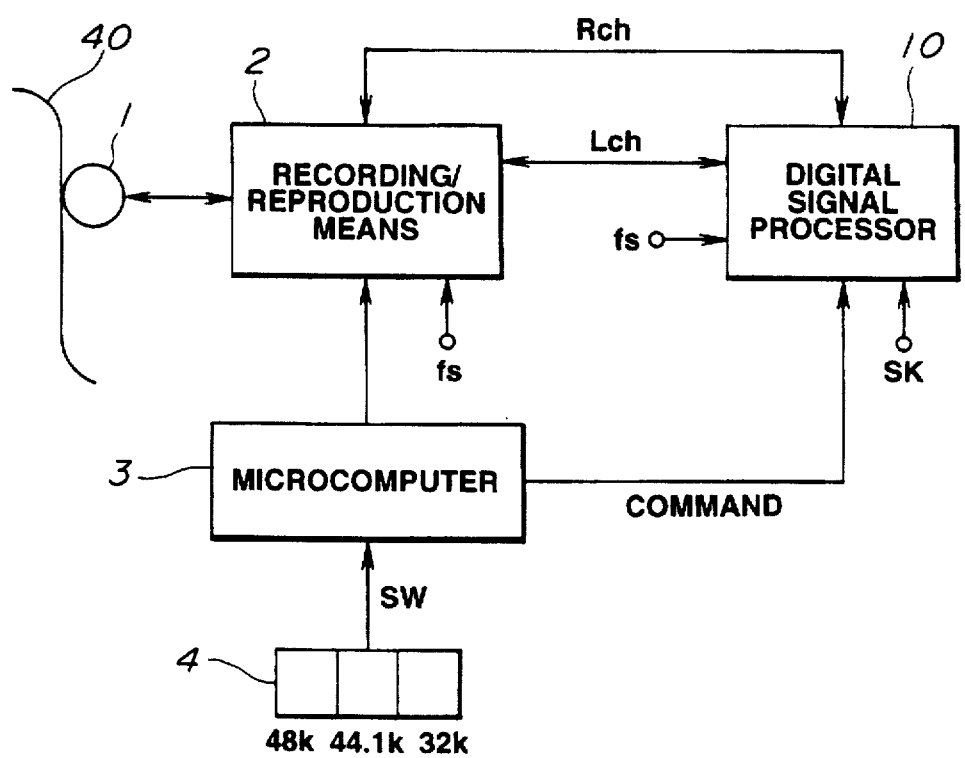
FIG. 1 is a schematic construction drawing of a DAT in which a digital signal processor of the present invention is installed.

A digital signal processor according to the present invention is constituted as shown in FIG. 1 for example.

The digital signal processor shown in FIG. 1 is an embodiment in which the present invention is applied to a digital audio tape recorder (hereinafter referred to as DAT).

The above DAT comprises a drive, circuit for driving a magnetic tape 40 mounted, as shown in FIG. 1, so that the traveling direction and speed of the magnetic tape 40 can be selectively set, a drum type rotation head 1 for recording and reproducing information signals of a track each time when it rotates a turn over the main surface of the magnetic tape 40 driven by the drive, in the scanning direction, a recording/ reproduction device 2 for PCM-demodulating audio signals reproduced by the rotation head 1 to output voice or PCM-modulating supplied audio signals, a digital signal processor 10 for processing information signals PCM-demodulated by the recording/reproduction device 2 to supply the processed signals to the recording/reproduction device 2, a microcomputer 3 for controlling the recording/reproduction device 2 and the digital signal processor 10, and a mode setting means 4 for setting control condition in the micro computer 3 in response to operation mode of the DAT.

The above micro computer 3 sets a sampling frequency in the above recording/reproduction device 2 according to control condition set by the mode setting means 4, and operates the recording/reproduction device 2 and the digital signal processor 10 synchronizing with sampling clock signal fs to make the digital signal processor 10 to perform signal processing in response to command signal.

As shown in FIG. 2, this DAT standard has four 1recording/reproduction modes and two reproduction specialized modes.

The above recording/reproduction mode contains 48 k mode in which the sampling frequency is 48 KHz and the quantizing bit number is 16 bits, 32 k mode in which the sampling frequency is 32 KHz and the quantizing bit number is 16 bits, 32 k-LP mode in which the sampling frequency is 32 KHz, the quantizing bit number is 12 bits and the channel number is two, and 32 k-4CH mode in which the sampling frequency is 32 k, the quantizing bit number is 12 bits and the channel number is four. The 48 k mode is equipped as standard and other modes are optionally available.

Further, the above reproduction specialized mode contains standard 44 k mode in which the sampling frequency is 44.1 KHz, the quantizing bit number is 16 bits and the traveling speed and track pitch of a magnetic tape are standard, and 44 k-WT mode in which the sampling frequency is 44.1 KHz, the quantizing bit number is 16 bits and the traveling speed and track pitch of the magnetic tape are 1.5 times the standard. Both the modes are equipped as standard.

In this DAT, information signals of two tracks are contained in a single frame and digital information signals of each track are recorded in the main data area of the magnetic tape 40. Each tracks in the single frame are interleaved.

This interleaving scatters error-information caused due to a positional deviation between a track position of the magnetic tape 40 and the above rotation head 1, suppressing omission of information signal.

The above main data area is composed of 128 blocks as shown in FIG. 3A, comprising synchronous signal (SYNC), main ID signal W1, main ID signal W2, main ID parity signal and main data MD1, MD2 in order from the beginning.

The above main data MD1 and main data MD2 comprise audio signals and are interleaved individually. This interleaving scatters error information due to floating of the magnetic tape 40 from the rotation head 1 and the like, suppressing omission of information signals. Further, parity signs C1, C2 by duplex (32, 28) read Solomon sign are provided to enable correction of errors.

When the main data MD1 and MD2 are recorded according to the specification of each recording/reproduction mode about the rotation speed of the rotation head 1, the sampling frequency, quantizing bit number and the like shown in FIG. 2, an empty area is produced in the main data MD1 and MD2 when any mode is selected. In this empty area, sub-data SD1 and SD2 each having 8 blocks are recorded as shown in FIGS. 3B, 3C. Further, the main data MD1 and MD2 are each divided into eight areas and the respective blocks of sub-data SD1 and SD2 are allocated successively in corresponding areas of the divided main data MD1, MD2.

A 1-block format of the above main data MD1, MD2 is composed of symbols (each having 8 bits) which are synchronous signal (SYNC), main ID signal W1, main ID signal W2 and main ID parity signal which are placed successively from the beginning, and main data comprising 8×32 symbols.

As shown in FIG. 4B, the above main ID signal W1 comprises format ID0–ID7 in which a specification necessary for recording and reproduction is set and frame addresses to be allocated in each track for the traveling direction of the above magnetic tape. In the format ID2 for example, sampling frequency of digital information signal is set as shown in FIG. 4C. In the format ID3, the number of channels in main data within a single track is set. In the format ID4, quantizing rule such as quantizing bit number is set. In the format ID5, track pitch is set.

In the above main ID signal W2, an block address of every 8 blocks from the beginning of each track is set as shown in FIG. 4B.

Figures 5A, 5B:
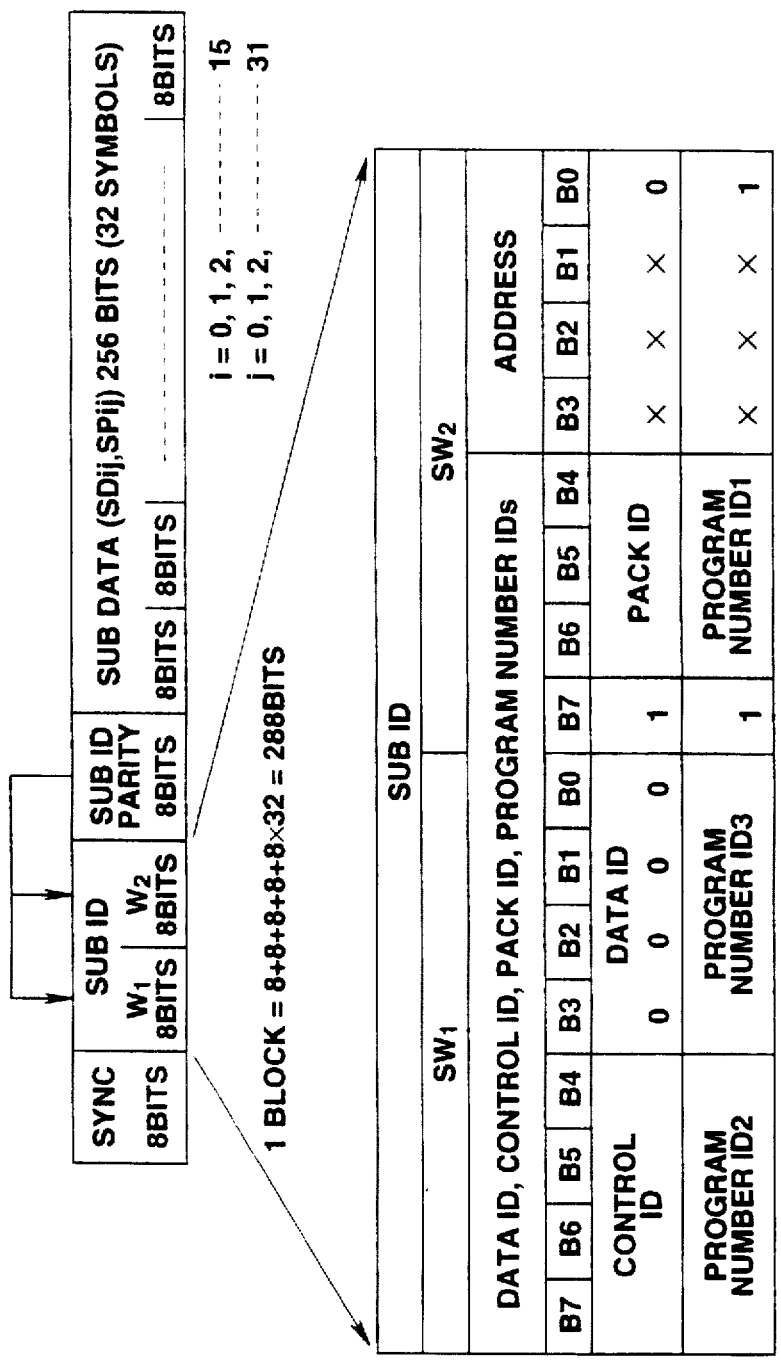

As shown in FIG. 5A, an 1-block format of the above sub-data area is composed of symbols which are synchronous signal (SYNC), sub ID signal SW1, sub ID signal SW2 and sub ID parity signal successively from the beginning, and sub-data comprising 8×32 symbols.

The above sub ID signals SW1, SW2 contain control ID in which data necessary for rapid search is set, data ID, pack ID and program ID1 to ID3 as shown in FIG. 5B. In the control ID, table of contents information (hereinafter referred to as TOC information) which functions as a content of the beginning position of a music, allocation position of each movement, its capacity and the like is set. In the data ID, the purpose of use of sub ID signals SW1, SW2 is set. In the pack ID, configuration of the sub ID signals SW1, SW2 and allocation of each data are set. In the program ID1 to ID3, a program for edition and the like is set.

Figure 6:
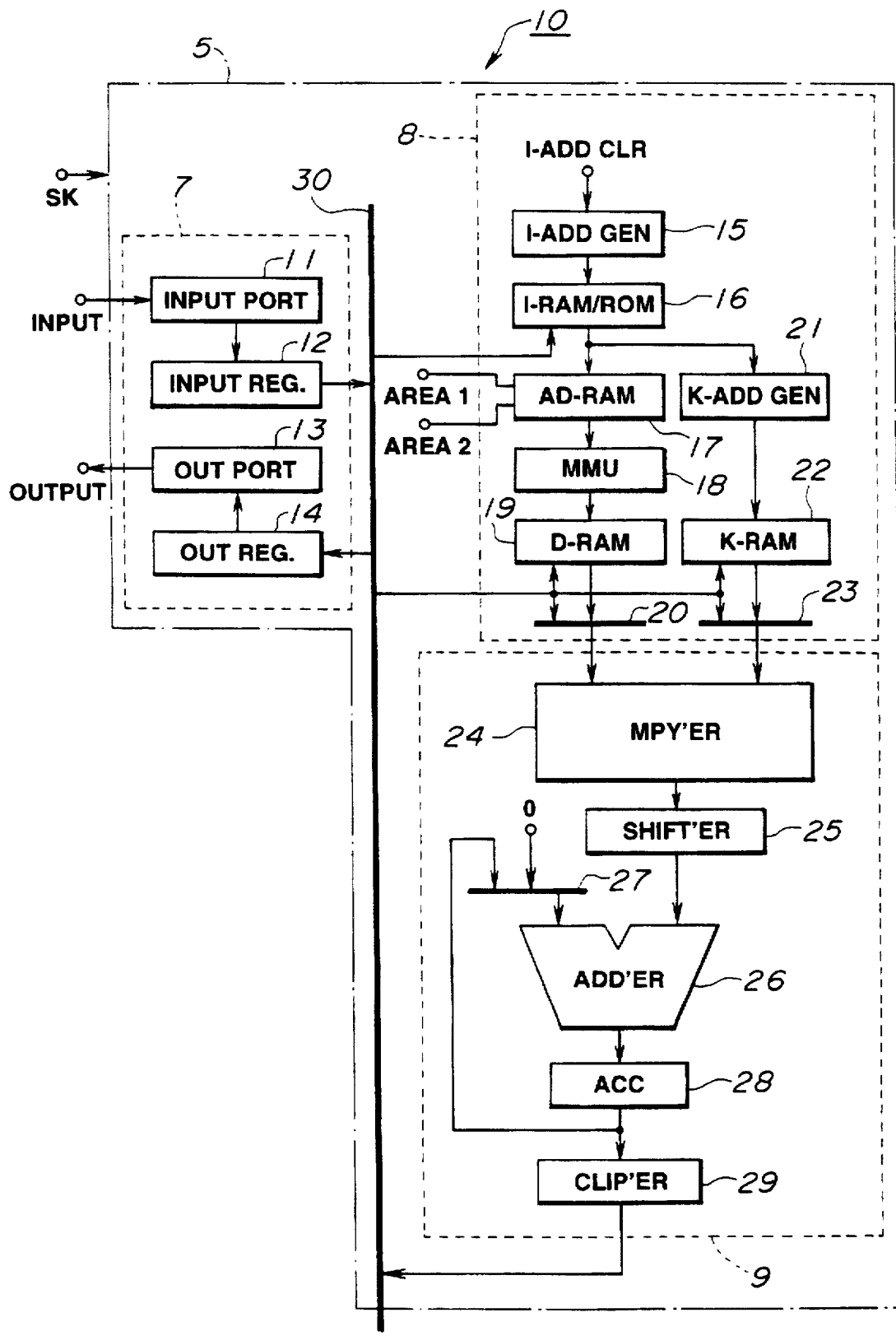
FIG. 6 is a schematic construction diagram of a digital signal processor according to an embodiment of the present invention.

As shown in FIG. 6, the digital signal processor 10 according to an embodiment of the present invention which is installed in the above DAT comprises an interface 7 for inputting and outputting digital information signals, a coefficient setting circuit 8 for matching a specific coefficient with digital information signal supplied from the interface 7, an arithmetic operation circuit 9 for performing arithmetic operations on digital information signals and coefficients which are matched by the coefficient setting means 8, and a bus 30 for connecting the interface 7, the coefficient setting circuit 8 and the arithmetic operation circuit 9.

The above interface 7 includes an input port 11 to which digital information signals are supplied, an input register 12 which sends digital information signals supplied to the input port 11 synchronous with system clock signal sk successively to the above bus 30, an output register 13 to which digital information signals are supplied from the bus 30 synchronous with the sampling clock signal fs, and an output port 14 which sends digital information signals supplied from the output register 13.

The above coefficient setting circuit 8 includes an instruction address generator 15 for generating instruction addresses, an instruction address memory 16 in which an instruction signal TD is read out for each instruction address, a data address generator 17 for generating address for data in response to the instruction signal TD, a memory management unit 18 for managing address for data generated in the data address generator 17, a data memory 19 in which digital information signal is written readably for each address supplied from the memory management unit 18, a data selector 20 which selects digital information signal supplied from the data memory 19 or the bus 30 and sends it, a coefficient address generator 21 for generating address for coefficient in response to the instruction signal TD, a coefficient memory 22 which writes a coefficient readably for address for each coefficient and a coefficient selector 23 which selects and sends a coefficient supplied from the coefficient memory 22 or the above bus 30.

In the above instruction address generator 15, a previous address is reset by an address clear signal generated by a rise of sampling clock and count value is incremented by 1 each synchronous with system clock signal of the DAT to determine an instruction address.

In the instruction memory 16, instruction memorized in instruction address supplied from the above instruction address generator 15 is read out and sent to the data address generator 17 and the coefficient address generator 21.

Figure 7:
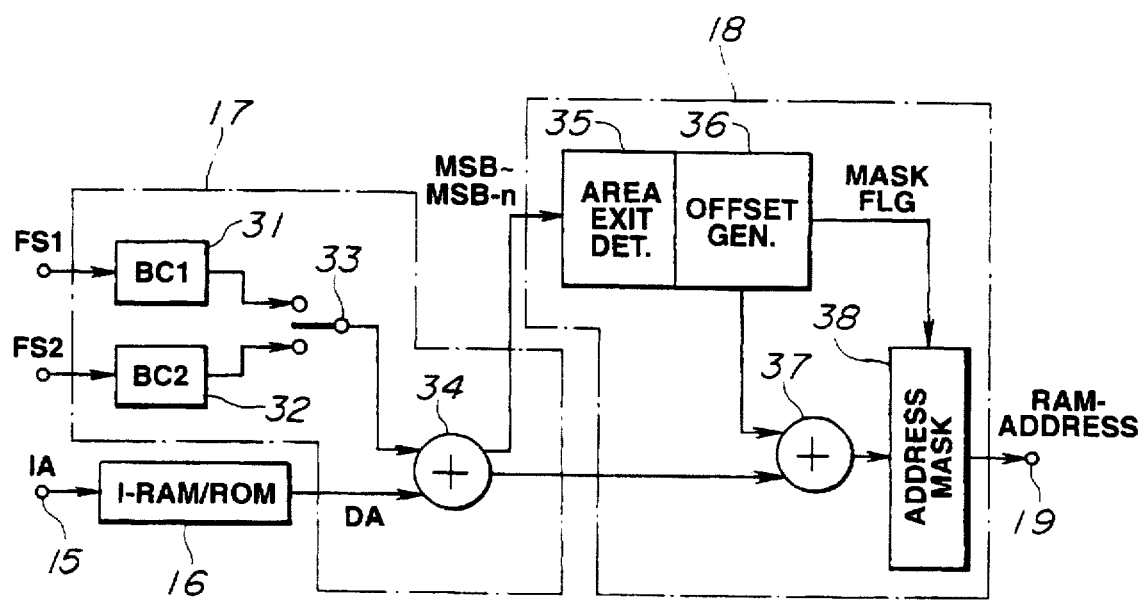
FIG. 7 is a construction drawing of major parts of the above digital signal processor.

As shown in FIG. 7, the above data address generator 17 comprises a BC1 counter 31 which increments in response to, for example, a rise of sampling frequency FS1, a BC2counter 32 which increments in response to, for example, a rise of sampling frequency FS2, a switch 33 which selects and sends output signal of the BC1 counter 31 or output signal of the BC2 counter 32, and an adder 34 which makes modulo addition of output signal of the switch 33 to data address portion DA of instruction signal ID outputted from the instruction memory 16 and sends it to a memory management unit 18.

The above switch 33 can be switched in response to sampling frequency of digital information signal supplied to the above interface 7 according to a code of the instruction memory 16.

In the above coefficient address generator 21, a coefficient address is read out in response to instruction read out from the above instruction memory 16.

As shown in FIG. 7, the memory management unit 18 comprises an area detecting circuit 35 which detects address area according to an output signal supplied from the adder 34 of the above data address generator 17, an area signal generating circuit 36 which generates offset signals and mask flag signals in response to the result of detection of the area detecting circuit 35, an adder 37 which makes modulo addition of the offset signal to output signal of the adder 34, and a mask circuit which masks output signal of the adder 37 when a mask flag signal is supplied from the area signal generating means 36 and then supplies it to the data memory.

The above data address generator 17 and the memory management unit 18 function as an address generating circuit. Hereinafter, the operation of this address generating circuit will be described.

Figure 8:
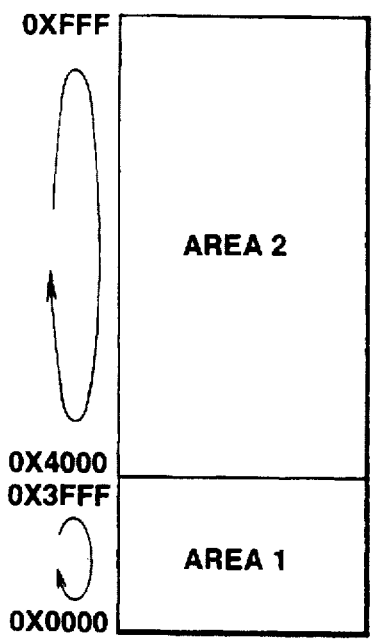
FIG. 8 is a schematic diagram of the address area of the data memory of the above digital signal processor.

As shown in FIG. 8, address area of the data memory 19 is divided into first and second address areas, AREA 1, AREA 2. The first and second address areas AREA 1, AREA 2 are assumed to be (0X0000) to (0X3FFF) and (0X4000) to (0XFFFF) respectively. In this first address area AREA 1, digital information signal supplied synchronous with sampling clock signal FS1 as shown in FIG. 9 is memorized and in the second address area AREA 2, digital information signal supplied synchronous with sampling clock signal FS2 shown in FIG. 10 is memorized.

Figure 9:
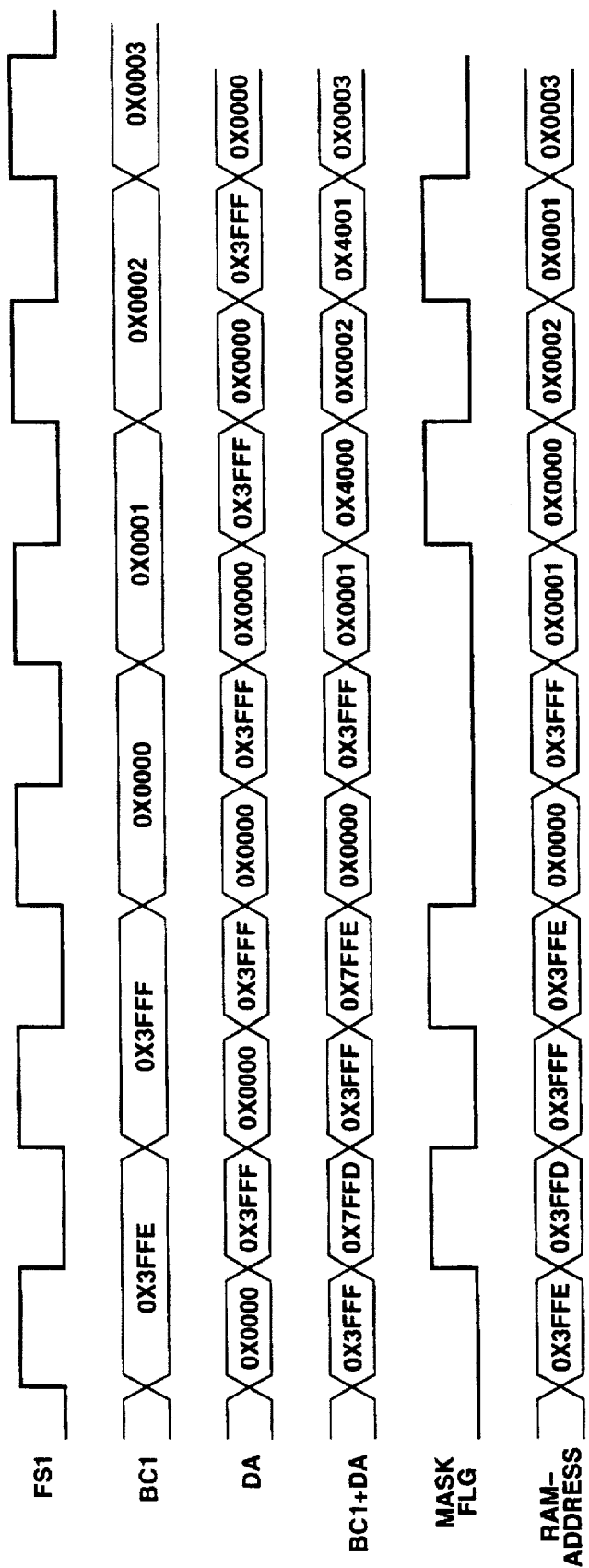
FIG. 9 is a construction diagram of the address generating means when sampling clock signal FS1 is supplied to an address generating means of the above digital signal processor.

When an instruction code accesses the first address area AREA 1, data address DA (0X0000 to 0X3FFF) supplied by the instruction is logical address as shown in FIG. 9 and physical address obtained by making modulo addition thereof to base counter (0X0000–0X3FFF) which is incremented by sampling clock FS1 is sent to the area detecting circuit 35. When physical address indicates an address other than the first address area AREA 1, the area detecting circuit 35 builds MASKFLG to mask upper bits. Only when the physical address is the first address area AREA 1 which begins with 0X000, address area can be divided by only masking upper address.

Figure 10:
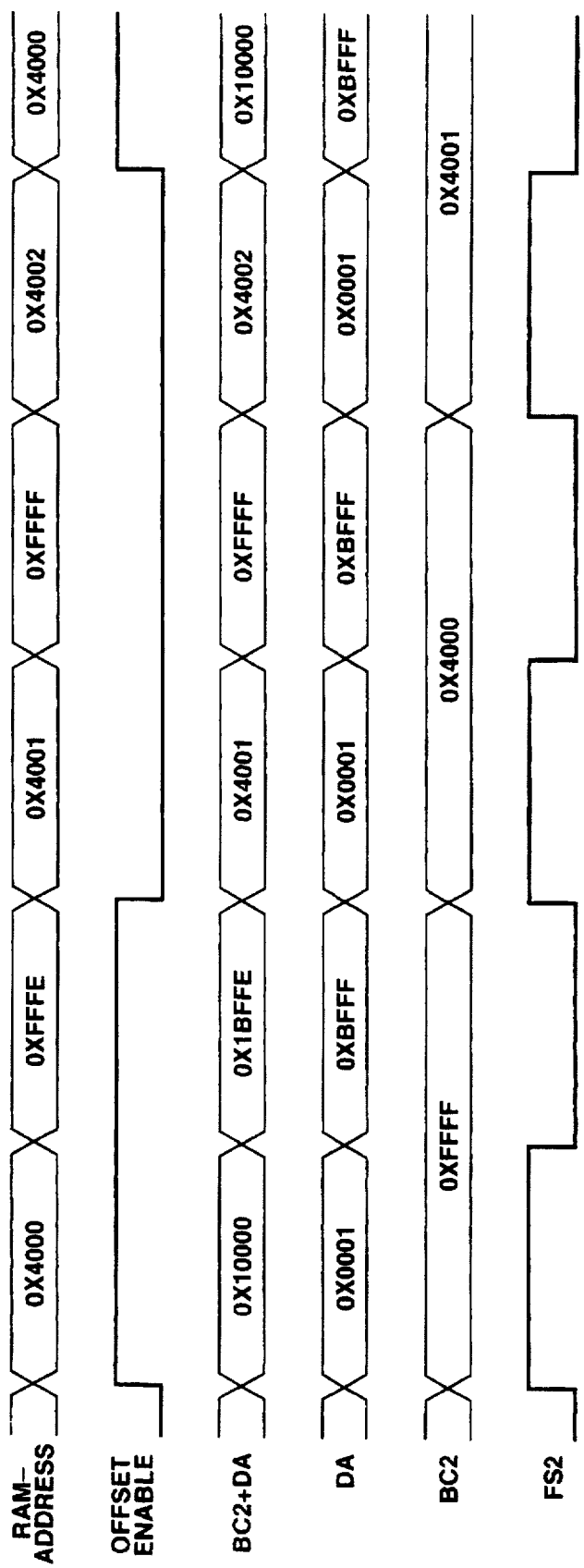
FIG. 10 is a construction diagram of the address generating means when sampling clock signal FS2 is supplied to an address generating means of the above digital signal processor.

When an instruction code accesses the second address area AREA 2, data address DA (0X4000 to 0XFFFF) supplied by the instruction is logical address as shown in FIG. 10 and physical address obtained by making modulo addition thereof to base counter (0X4000–0X3FFF) which is incremented by sampling clock FS2 is sent to the area detecting means 35. When physical address indicates an address other than the second address area AREA 2, the area detecting means 35 builds OFFSET Enable to add offset value (0X4000 in this case).

Additionally, in the case of two divisions, the same operation can be made by bit-inversing physical address while assuming that logical address by an instruction of the second address area AREA 2 is 0X0000 to 0XBFFF and the base counter is 0X0000 to 0XBFFF.

Further, the above mask processing and offset processing enable configurations of more than three divisions.

In the above coefficient memory 22, coefficients of main data MD1, MD2 supplied through the above bus 30 are written readably into address for data generated in the above coefficient address generator 21.

In the above data memory 19, main data MD1, MD2 are written readably into address for data generated in the above data address generator 17 through the above bus 30.

The above coefficient selector 23 selects and sends coefficients of the main data MD1, MD2 supplied through the above bus 30 or coefficient read out from the coefficient memory 22 in response to a command signal supplied from the instruction memory.

The above data selector 20 selects and sends the main data MD1, MD2 supplied through the above bus 30 or the main data MD1, MD2 read out from the above data memory 19 in response to a command signal supplied from the instruction memory 16.

The above arithmetic operation circuit 9 includes a multiplier 24 for multiplying coefficient supplied from the coefficient selector 23 of the above coefficient setting circuit 8 by main data MD1, MD2 supplied from the data selector 20, a shifter 25 which shifts output signal of the multiplier 24 or holds it without shifting, an adder 26 in which output signal is supplied from the shifter 25 to an input terminal and which adds the output signal to a signal supplied to the other input terminal, an accumulator 27 for memorizing output signals of the adder 26, a selector 28 which selects a signal memorized in the accumulator 27 or 0 and supplies it to the other input terminal of the input terminal, and a clipper 29 which rounds up output signal of the accumulator 27 to a word length of the above bus 30 and supplies it to the bus 30.

In the above arithmetic operation circuit 9, impulse signals of audio signals constituting 8-bit main data MD1, MD2 of each sampling frequency fs, for example, are supplied from the selector 20, and then coefficient b of each impulse signal is supplied from the selector 23. The multiplier 24 multiplies the impulse signal by the coefficient b successively from the first impulse signal to impulse signal delayed to the N and the adder 26 adds the results of the N+1 multiplication successively. The accumulator 27 accumulates the results of the addition successively to output impulse response H(Z) of actual frequency characteristic which is expressed by the following expression (1).

[Expression 1]
$$H(Z) = \sum_{i=0}^{n} b_i Z^{-1} \quad (1)$$

As mentioned above, the arithmetic operation circuit 9 functions as a finite impulse response (hereinafter referred to as FIR) noncyclic type digital filter, which is capable of improving a feeling of being at live performance due to a difference of sound field by the audio signals by making arithmetic operation so as to produce a specified difference of time between Rch and Lch of the audio signal.

The digital signal processor 10 having the above mentioned construction divides the data memory into the first address area and the second address area and undertakes masking processing and offset processing on address numbers by means of the address generating means. As a result, in the first and second address areas, information signals supplied synchronous with the first and second sampling clock signals are written readably to avoid writing information signals into address beyond each address area in the data memory. Thus with such simple construction, overwriting of information signals into each different address area is avoided to prevent damage of data.

Although a case in which the BC1, BC2 counters 31, 32 count pulse numbers of the sampling clock signals FS1, FS2 is described in this embodiment, the digital signal processor according to the present invention is not restricted to this construction. For example, the present invention can be applied to a case in which the frequencies of pulses to be counted by the BC1, BC2 counters 31, 32 can be variably set or sampling clock signals of two or more types of frequencies can be counted with two or more counters.

Although a case in which the data memory 19 is divided into the first and second address areas in the above mentioned embodiment, the digital signal processor according to the present invention is not restricted to this construction and this invention can be applied to a case in which the data memory 19 is divided into three or more address areas.

As described above in details, according to the digital signal processor of the present invention, the data memory is divided into the first address area and the second address area and then information signals supplied synchronous with the first and second sampling clock signals are written readably in the first and second address areas. Thus, it is possible to provide a digital signal processor capable of avoiding overwriting of information signals with such simple construction and preventing damage of the information signal data.

Further, the address generating circuit masks address numbers by means of a masking circuit according to the result of the detecting of the area detecting circuit and offsets by means of the offset circuit to avoid writing of information signals into address beyond each address area in the data memory. Thus it is possible to provide a digital signal processor capable of avoiding overwriting of information signals and preventing damage of the information signal data with such simple construction.

What is claimed is:

1. A digital signal processor, comprising:

a first counter which increments from a first initial address value in a first address area synchronous with a first sampling clock signal;

a second counter which increments from a second initial address value in a second address area synchronous with a second sampling clock signal;

address generating means which generates a first address in said first address area according to a first counter value in said first counter and generates a second address in said second address area according to a second counter value in said second counter;

a data memory which stores information signals supplied synchronously with said first and second sampling clock signals in the first address and second address generated by said address generating means; and arithmetic operating means which reads and perform arithmetic operations on information signals stored in said data memory;

wherein said address generating means includes first mask means and an area detecting means, said area detecting means detecting an address area based on a sum of addresses specified by an output of said first mask means and one of said first counter value and said second counter value, and wherein said first mask means masks said first address value according to a detection result of said area detecting means.

2. The digital signal processor according to claim 1, wherein said address generating means further includes second mask means and said area detecting means for detecting an address area detects said address area based on the sum of an output of said second mask means and one of an address specified by said first counter value and said second counter value, and wherein said second mask means masks said second address value according to said detection result of said area detecting means.

3. The digital signal processor according to claim 2, wherein said address generating means further includes offset means and said area detecting means detects said address area based on the sum of an output of said offset means and said address specified by one of said first counter values and said second counter values, and wherein said offset means offsets said second address value according to said detection result of said area detecting means.

* * * * *